(12) United States Patent
Geiger et al.

(10) Patent No.: US 6,748,169 B1
(45) Date of Patent: Jun. 8, 2004

(54) METHOD FOR MEASURING THE SIGNAL QUALITY OF AN OPTICAL DATA SIGNAL

(75) Inventors: Harald Geiger, Neuried (DE); Christoph Glingener, Feldkirchen-Westerham (DE); Erich Gottwald, Holzkirchen (DE)

(73) Assignee: Siemens Aktiengesellschaft, Munich (DE)

( * ) Notice: Subject to any disclaimer, the term of this patent is extended or adjusted under 35 U.S.C. 154(b) by 593 days.

(21) Appl. No.: 09/603,882

(22) Filed: Jun. 26, 2000

(30) Foreign Application Priority Data

Jun. 24, 1999 (DE) .......................... 199 28 940

(51) Int. Cl.$^7$ .............................. H04B 10/08
(52) U.S. Cl. ................. 398/26; 398/9; 398/25; 398/27; 398/31; 398/33; 398/38; 398/79; 398/82
(58) Field of Search ................ 398/79, 82, 25, 398/26, 27, 31, 33, 38, 9

(56) References Cited

U.S. PATENT DOCUMENTS 5,790,289 A * 8/1998 Taga et al. .................. 359/124
5,986,782 A * 11/1999 Alexander et al. .......... 359/110
6,268,943 B1 * 7/2001 Kang ......................... 359/110
6,285,481 B1 * 9/2001 Palmer ....................... 359/159
6,341,024 B1 * 1/2002 Jeong ......................... 359/130

OTHER PUBLICATIONS

HP 71452B Optical Spectrum Analyzer, Product Note 71452–2, 1995, "EDFA Testing with the Time–Domain–Extinction Technique".

Mikrowellen Messtechnik, von Prof. Dr.-Ing. Horst Groll, 1969, Kapitel 3 —Messempfänger.

* cited by examiner

Primary Examiner—Leslie Pascal
Assistant Examiner—Hanh Phan
(74) Attorney, Agent, or Firm—Morrison & Foerster LLP

(57) ABSTRACT

A method for measuring the signal quality of an optical data signal is provided. To measure the signal quality, and in particular the signal-to-noise ratio of an optical data signal which has data-free time intervals, the signal strength of the transmitted optical data signal is measured during a data transmission. The signal strength of the noise signal is determined during the data-free time intervals. The signal-to-noise ratio is determined and used as a criterion for the signal quality of the optical data signal.

6 Claims, 3 Drawing Sheets

METHOD FOR MEASURING THE SIGNAL QUALITY OF AN OPTICAL DATA SIGNAL

This application is based on German priority application 19928940.9, which is hereby incorporated in its entirety by reference.

TECHNICAL FIELD OF THE INVENTION

The invention relates to a method of measuring the signal quality of an optical data signal, and in particular, to a method of measuring an optical data signal which has data-free time intervals.

BACKGROUND OF THE INVENTION

In conventional optical transmission systems, and in particular transmission systems operating according to the WDM (Wavelength Division Multiplexing) principle, an optical data signal transmits data as data packets. The data packets may include different types of signals (specifically when WDM technology is used), and multiple transmission channels can be assigned to the individual data packets. These types of signals can differ both in terms of the protocol used and/or the data transmission rates used. Examples of signal types include ATM (Asynchronous Transfer Mode), IP (Internet Protocol) and Gigabit Ethernet.

When monitoring the transmission characteristics of the optical transmission system or of an optical transmission link, the signal quality of the optical data signal currently being transmitted can be determined. In this regard, optical signal characteristic variables in the optical data signal are used to assess the signal quality of the optical data signal. These characteristics may include, for example, the optical signal-to-noise ratio or the signal distortions caused by optical transmission fibers or optical transmitter devices.

In conventional optical transmission systems, such as transmitter devices, optical transmission links are terminated electronically and require an opto-electronic conversion of the data signal.

The signal quality of the optical data signal can thus be determined by the transmitter device with reference to a measurement of the data signal which is opto/electrically converted. As optical transmission systems or transmitter devices are increasingly used, there is a considerable need for methods of measuring the signal quality of optical data signals during an optical data transmission, without the need for a preceding opto/electrical conversion of the data signal which is to be monitored.

Hewlett Packard Product Note 71452-2 "Optical Spectrum Analyzer" discloses a method for determining the signal-to-noise ratio of an optical transmission channel in which a measuring instrument is used to transmit an optical measurement signal over an optical transmission link for assessment, the optical measurement signal being interrupted at irregular intervals. When the optical measurement signal is applied, an additional measuring instrument, arranged at the measuring point, is used to determine the signal strength of the optical measurement signal. After an interruption occurs in the optical measurement signal, i.e. in the signal-free time interval, the signal strength of the noise signal on the optical transmission link is determined. The signal-to-noise ratio of the optical transmission link can then be determined by reference to the measured signal strengths. Although the application of this method provides acceptable measurement results, it cannot be used for measuring the signal-to-noise ratio during "live traffic", i.e. during the current data transmission. This method cannot be used because an additional optical auxiliary signal or measurement signal has to be generated and transmitted over the optical transmission link or the optical transmission system.

Accordingly, a need exists for an improved method for measuring the signal quality of an optical data signal.

SUMMARY OF THE INVENTION

According to one embodiment of the present invention, a method is provided to measure the signal strength of a transmitted optical data signal. The signal strength of a noise signal is also measured during the data-free time intervals, and the signal-to-noise ratio is determined. The measured signal strengths are used as a criterion for the signal quality of the optical data signal. While the data signal is transmitted and monitored, its signal strength is measured. The optical data signal can then be used as a measurement signal for determining the signal-to-noise ratio of the transmission channel. Since the signal strength of the noise signal is measured during the data-free time intervals, interruptions in the transmission of data which occur in the optical data signal (or in the measurement signal and the data-free time intervals of the optical data signal) can be used to determine the signal strength of the noise signal. Hence, the signal-to-noise ratio of an optical signal element on an optical transmission link, which can be extracted from the optical data signal, can be determined at any desired point without a measurement signal being provided in addition to the data signal. As a result, the signal quality of an optical data signal can be assessed using the signal-to-noise ratio as a criterion, while data is being transmitted.

According to another embodiment of the present invention, a method is provided for selectively inserting additional data-free time intervals into an optical data signal to measure the signal quality. These data-free time intervals may be of the same length and may be inserted into the optical data signal at a predefined time interval. If the optical data signal has too few data-free time intervals to determine the signal-to-noise ratio, additional data-free time intervals may be inserted into the optical data signal. This ensures a requisite measuring accuracy and frequency for determining the signal-to-noise ratio and monitors the signal quality of an optical "point-to-point" transmission link.

The present invention also determines a measure of the signal distortion of the optical data signal which is caused by the optical fiber and/or optical transmitter devices, using the ratio of the lengths of the data-free time intervals to the data-transmission time intervals. In addition, to measure the signal strength of the noise signal and of the optical data signal, the chronological lengths of the data-free time intervals and of the data-transmission time intervals (i.e. time intervals in which data are explicitly transmitted) are determined and a ratio is formed between them. The ratio, which is obtained at the site of the measurement, includes, compared to the ratio obtained when the original optical data signal is emitted, an evaluation criterion for the optical signal distortions which are caused by the optical fiber and/or optical transmitter devices.

BRIEF DESCRIPTION OF THE DRAWINGS

The invention will be explained below in more detail with reference to the following figures.

DETAILED DESCRIPTION OF THE INVENTION

Figure 1:
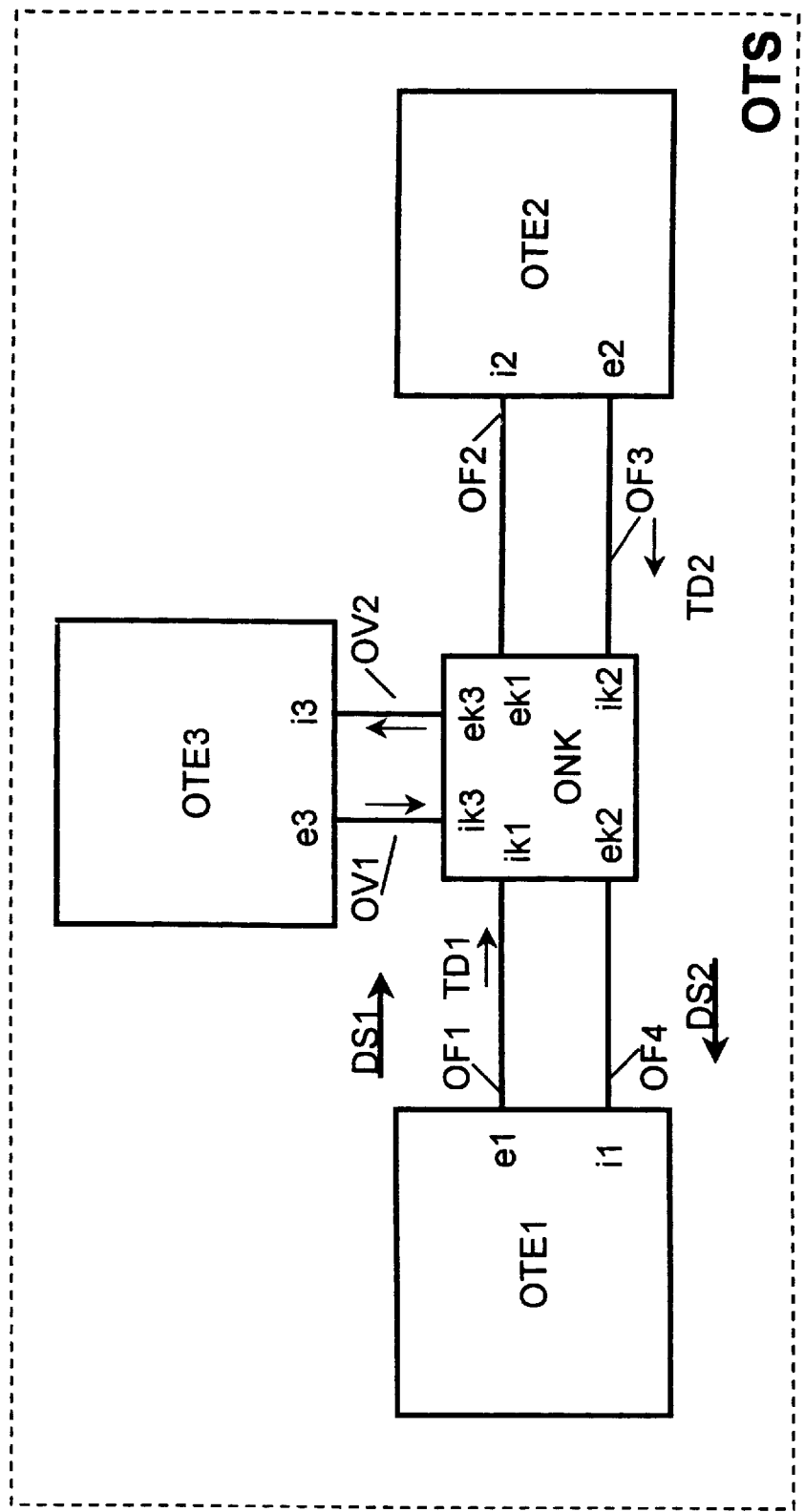
FIG. 1 illustrates an exemplary block circuit diagram of an optical transmission system.

FIG. 1 illustrates an optical transmission system (OTS) which has three optical transmitter devices OTE1–OTE3, the first optical transmitter device OTE1 has a first input i1 and a first output e1. The second optical transmitter device OTE2 has a second input i2 and a second output e2, and the third optical transmitter device OTE3 has a third input i3 and a third output e3. Optical network node (ONK) is provided in the optical transmitter system OTS and includes three node inputs ik1, ik2 and ik3, and three node outputs ek1, ek2 and ek3. The first output e1 of the first optical transmitter device OTE1 is connected via a first optical fiber OF1 to the first node input ik2 of the optical network node ONK. The first node output ek1 is connected, using the second optical fiber OF2, to the second input i2 of the second optical transmitter device OTE2. Similarly, the second output e2 of the second optical transmitter device OTE2 is connected via the third optical fiber OF3 to the second node input ik2 of the optical network node ONK. The second node output ek2 of the optical network node ONK is connected via the fourth optical fiber OF4 to the first input i1 of the first optical transmitter device OTE1. The first and second optical transmitter devices OTE1 and OTE2 are thus connected via the optical network node for optically transmitting data D.

A first data stream DS1 is preferably provided in a first transmitter device TD1 to optically transmit optical data from the first optical transmitter device OTD1 to the second optical transmitter device OTD2, and a second data stream DS2 is preferably provided in a second transmitter device TD2 to optically transmit data D from the second optical transmitter device OTD2 to the first optical transmitter device OTD1.

The third optical transmitter device OTE3 may be, for example, connected to the optical network node ONK and used to feed data into the first and/or the second data stream DS1 and/or DS2 via first and second optical connecting fibers OV1 and OV2. The third node input ik3 and the third node output ek3 of the optical network node ONK may be connected to the third output e3 and to the third input i3 of the third optical transmitter device OTE3, respectively. Hence, data present in the third optical transmitter device OTE3 can be fed, using the first and second connecting fibers OV1 and OV2 and the optical network node ONK, into the first or second data streams DS1 and DS2 in a first or second transmission direction TD1 or TD2. Data to be transferred to the third optical transmitter device OTE3 are read out of the first or second data streams DS1 and DS2, and transmitted to the third optical transmitter device OTE3.

Figure 2:
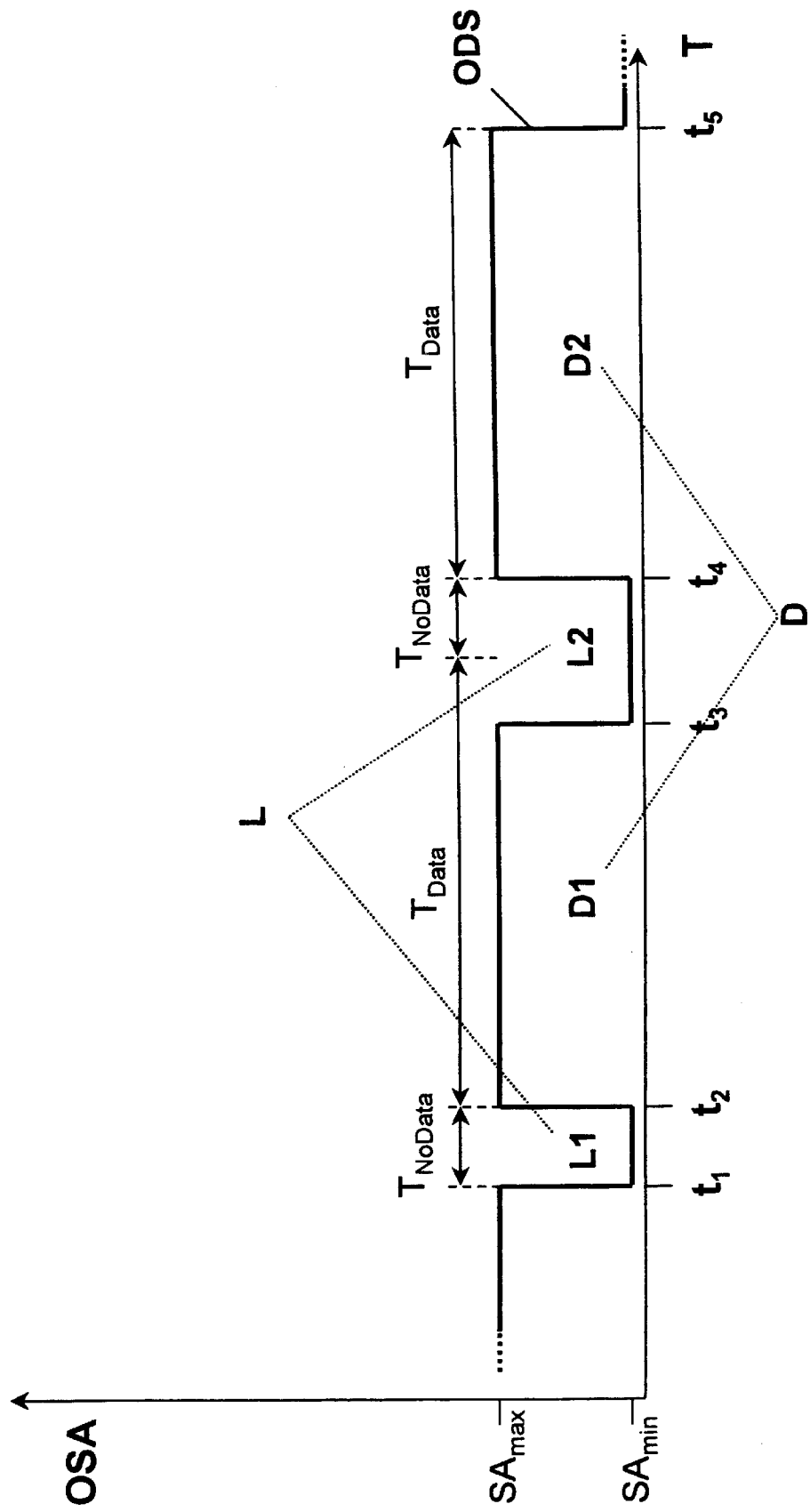
FIG. 2 illustrates an optical signal structure which occurs during the optical transmission of data.

FIG. 2 illustrates the optical data signal ODS which is provided to optically transmit data D in the first or second data stream. The diagram has a horizontal axis T and a vertical axis OSA. The horizontal axis displays the starting and ending times T of the transmission of data D, and the vertical axis OSA displays the amplitude OSA of the optical data signal ODS, or of the optical data D, which are to be transmitted. The optical data signal ODS, for example the first data stream DS1, includes time intervals $T_{Data}$ which contain data and data-free time intervals $T_{NoData}$. The time intervals $T_{Data}$ include data representing the optical data D which are to be transmitted, and the data-free time intervals $T_{NoData}$ include data representing the gaps L between the individual optical data D. A first gap and a second gap, L1 and L2, respectively, and first and second data D1 and D2, respectively, illustrate cases where the amplitude OSA and the signal strength of the optical data signal ODS do not exceed a maximum signal amplitude value $SA_{max}$ and do not drop below a minimum signal amplitude value $SA_{min}$. Hence, a gap L in the optical data signal ODS is implemented by an optical data signal ODS which has a minimum signal amplitude value $SA_{min}$, and data D which are transmitted, using an optical data signal ODS which has a maximum signal amplitude value $SA_{max}$.

At times $t_1$–$t_5$, the signal amplitude values $SA_{min}$, $SA_{max}$ of the amplitude OSA of the optical data signal ODS change.

At time $t_1$, the amplitude OSA of the optical data signal ODS assumes the minimum signal amplitude value $SA_{min}$, which also represents the start of a data-free time interval $T_{NoData}$ and the gap L1. After the data-free time interval $T_{NoData}$ has passed (at time $t_2$) the chronological end of the gap L1 is reached and the first optical data D1 is transmitted. At this time, the amplitude OSA of the optical data signal ODS assumes the maximum signal amplitude value $SA_{max}$. After optical transmission of the first optical data D1 (at time $t_3$), which corresponds to the duration of the time interval $T_{Data}$, the amplitude OSA of the optical data signal ODS is reset to the minimum signal amplitude value $SA_{min}$. That is, gap L2 arises in the first and/or second data streams DS1 and DS2.

At time $t_4$, or after the data-free time interval $T_{NoData}$ has expired, second optical data D2 is transmitted, i.e. the amplitude OSA of the optical data signal ODS assumes the maximum signal amplitude value $SA_{max}$. The amplitude OSA of the optical data signal ODS remains unchanged for the duration of the time interval $T_{Data}$. The amplitude OSA returns to the minimum signal amplitude value $SA_{min}$ at time $t_5$, after the time interval $T_{Data}$ expires, or after the transmission of the second optical data D2 (i.e. a further gap L2 follows the second optical data D2).

In order to measure the signal quality of an optical data signal ODS using a method consistent with the present invention, a multiplicity of such optical data D and gaps L are preferred. The combination of optical data D and gaps L constitute the continuous first and second data streams DS1 and DS2. Additional gaps L can also be inserted into the first and second data streams DS1 and DS2, wherein the time interval between the gaps L are capable of being the same length. However, the data-free time interval $T_{NoData}$ between successive data D1 and D2 is typically shorter than a millisecond, for example, in the microsecond region.

Figure 3:
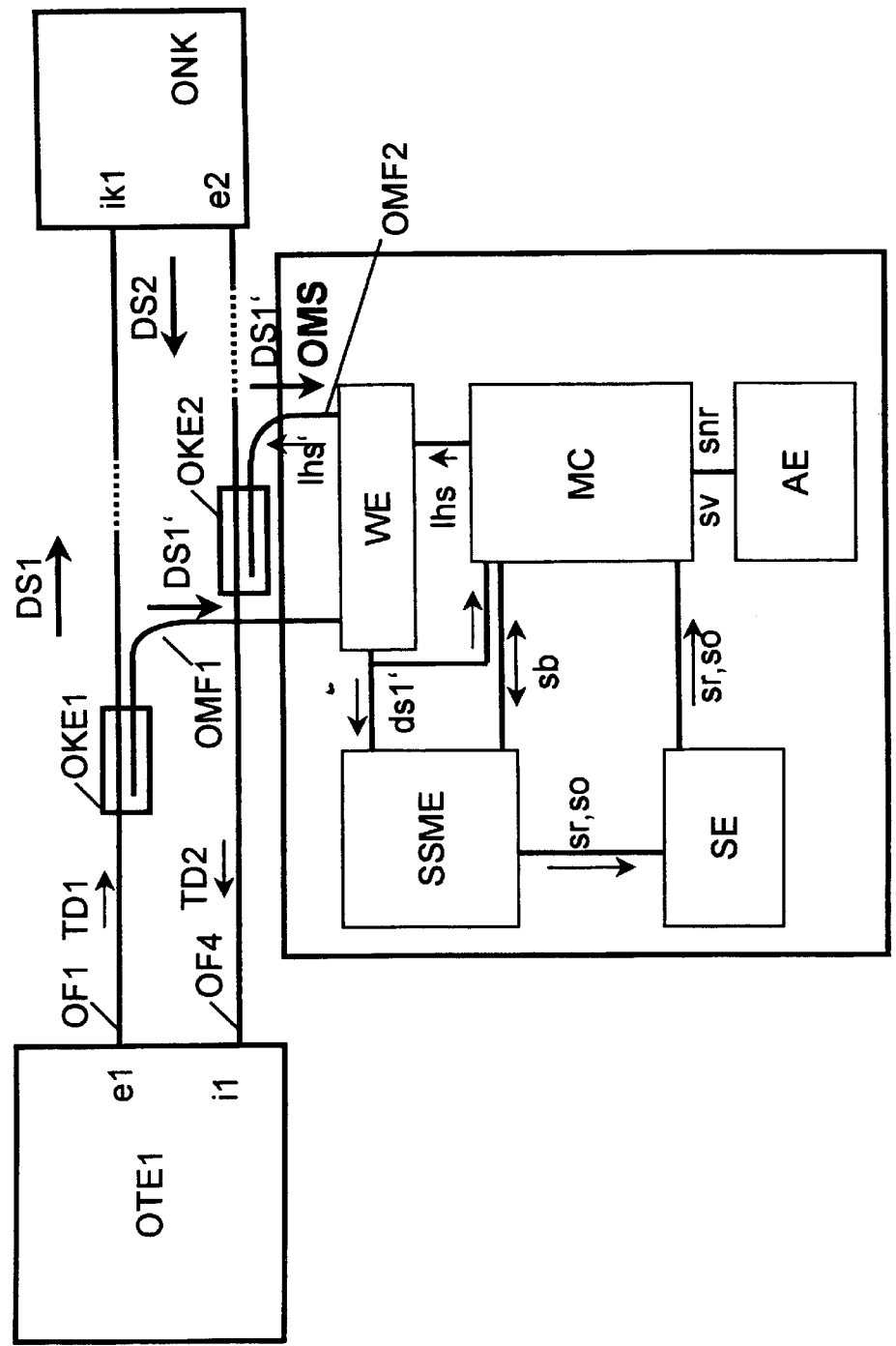
FIG. 3 illustrates a block circuit diagram of the optical measuring system of the present invention to determine the signal quality of an optical data signal.

FIG. 3 illustrates a block circuit diagram of an optical measuring system to determine the signal quality of an optical data signal. That is, the signal-to-noise ratio of the first optical data stream DS1 which may be used to monitor the transmission quality of the optical transmission link (illustrated in FIG. 1) between the first optical transmitter device OTE1 and the optical network node ONK. For this purpose, a first optical coupling element OKE1 is integrated into the first optical fiber OF1 at any desired measuring point. Coupling element OKE1 may be used to extract part of the first optical data stream DS1, which is transferred in the first transmission direction TD1. The first optical coupling element OKE1 is connected via a first optical measuring fiber OMF1 to the optical measuring system OMS. For this purpose, a second optical coupling element OKE2 is integrated, in a similar manner into the second optical fiber OF2 at the same measuring point. Coupling element OKE2 may be used to extract part of the second optical data stream DS2 which is transferred in the second transmission direction TD2. The second optical coupling element OKE is connected to the optical measuring system OMS via a second optical measuring fiber OMF2.

The optical measuring system OMS has a converter unit WE, a signal-strength measuring unit SSME, a storage unit SE, a control unit MC, and a display unit AE. The first and second optical measuring fibers OMF1 and OMF2 are routed to the converter unit WE which is connected to the signal-strength measuring unit SSME. In order to determine the signal-to-noise ratio snr, the control unit MC is connected to the signal-strength measuring unit SSME, to the converter unit WE, and to the storage unit SE. The display unit AE is also connected to the control unit MC in order to display the signal-to-noise ratio snr. The signal-strength measuring unit SSME is further connected to the storage unit SE.

Measuring the signal quality of an optical data signal DS1/DS2 is further explained below, with reference to the first optical data stream DS1. The determination of the signal quality of the second optical data stream DS2 may be performed in an analogous manner. The first optical coupling device OKE1 is used to divide part of the first optical data stream DS1 and transmit it via the first optical measuring fiber OMF1 to the optical measuring system OMS, or to the converter unit WE. In the converter unit WE, the divided portion of the first optical data stream DS1' is converted into a first electrical data stream ds1' and transferred to the signal-strength measuring unit SSME and to the control unit MC. In the control unit MC, the first electrical data stream ds1' is monitored for the occurrence of gaps L data-free time intervals $T_{NoData}$. When a gap L occurs, a measurement of the signal strength of the noise signal and/or of the noise on the transmission link is initiated directly using control command sb transmitted to the signal-strength measuring unit SSME, i.e. the noise signal strength sr is determined in the signal-strength measuring unit SSME. The measured noise signal strength sr is subsequently buffered in the storage unit SE. While data D is currently being transmitted, i.e. during the time intervals $T_{Data}$, the signal strength of the first electrical data signal ds1' is determined cyclically by the signal-strength measuring unit SSME. In each case, the currently measured value of the data signal strength sd is buffered in the storage unit SE.

To determine the signal-to-noise ratio snr, the noise signal strength sr, which is buffered in the storage unit SE, and the data signal strength sd are read out of the storage unit SE by the control unit MC. The noise signal strength sr and the data signal strength sd, are used in the control unit MC to determine the signal-to-noise ratio snr of the first optical data stream DS1 being transmitted. The noise signal strength sr and the data signal strength sd are displayed via the display unit AE. The signal-to-noise ratio snr can be displayed either audibly or visually.

The length of the data-free time intervals $T_{NoData}$ and the length of the time intervals $T_{Data}$ which contain data are determined by the control unit MC, and a ratio is formed between them. The value which is obtained from the ratio of the data-free time intervals $T_{NoData}$ to the time intervals $T_{Data}$ which contain data is a measure, for example, of the signal distortions sv caused in the optical data signal ODS by the first optical fiber OF1 or the first optical transmitter device OTE1. This value may be used to assess the transmission quality of the optical transmission link. The value for the signal distortion sv in the optical data signal ODS, which distortion is determined in the control unit MC, is displayed using the display unit AE.

The control unit MC determines the frequency of the occurrence of gaps L within the first electrical data stream ds1', and indicates them to the optical transmitter device OTE1. For this purpose, a value for the frequency of the occurrence of gaps L is determined in the control unit MC and an electrical gap frequency signal lhs, which represents this value, is transmitted to the converter unit WE. The electrical gap frequency signal lhs is converted into an optical gap frequency signal lhs' in the converter unit WE and is transmitted to the second optical coupler unit OKE2 via the second optical measuring fiber OMF2.

The second optical coupler unit OKE2 is used to inject the optical gap frequency signal lhs' into the second optical data stream DS2, and is transmitted to the first optical transmitter device OTE1. When there is an optical gap frequency signal lhs', which has an excessively low level and which corresponds to, for example, an excessively low gap frequency value, the first optical transmitter device OTE1 can insert additional data-free time intervals $T_{NoData}$ into the first optical data stream DS1 in order to measure the signal quality more precisely. The inserted data-free time intervals $T_{NoData}$ may be of equal length, and may be inserted at a pre-defined time interval.

In order to increase the measuring accuracy, the described measurements of the signal strengths are repeated, and the average value is formed from the calculated signal-to-noise ratio values. As a result, in order to ensure a minimum measuring accuracy when the gap frequency within the first optical data stream DS1 to be transmitted is excessively low, additional gaps L are inserted into the first optical data stream DS1.

In addition, the optical measuring system OMS can be used to insert into the data-free time intervals $T_{NoData}$ of the optical data signal ODS brief test signals or test signal patterns which can be used to examine selectively, for example, non-linear effects of the reaction of the optical transmission system OTS and/or of the optical transmission link.

The application of the method according to the invention is in no way restricted to WDM transmission systems but can instead be used to implement any optical transmission link.

We claim:

1. A method for measuring the signal quality of an optical data signal which has data-free time intervals within an optical network node of an optical transmission system, comprising:

extracting a portion of the optical data signal within the optical network node;

converting the extracted portion of the optical data signal into an electrical data signal;

monitoring the electrical data signal for the occurrence of data-free time intervals;

measuring a signal strength of a transmitted optical data signal;

measuring a signal strength of a noise signal during the occurrence of the data-free time intervals;

measuring a signal strength of the electrical data signal during data transmission; and determining a signal-to-noise ratio by reference to the measured signal strengths as a criterion for the signal quality of the optical data signal.

2. The method according to claim 1, further including selectively inserting additional data-free time intervals into the optical data signal in order to measure the signal quality.

3. The method according to claim 2, wherein the additional data-free time intervals are of a same length and are inserted into the optical data signal at a predefined time interval.

4. The method according to claim 1, further comprising determining a signal distortion of the optical data signal from a ratio of lengths of data-free time intervals to data-transmission time intervals, wherein the distortion is caused by an optical fiber or an optical transmission device.

5. The method according to claim 1, wherein optical test signals are inserted into the data-free time intervals of the optical data signal.

6. The method according to claim 1, wherein the signal quality of the optical data signal is measured while an optical data transmission occurs.

* * * * *